United States Patent

Normann et al.

[11] Patent Number: 5,965,808
[45] Date of Patent: Oct. 12, 1999

[54] METHOD OF OPERATING TIRE PRESSURE SIGNALLING DEVICES ON WHEELS FITTED WITH PNEUMATIC TIRES

[76] Inventors: Norbert Normann, Panoramastrasse 12, D-75223, Niefern-Öschelbronn; Günter Uhl, Hauptstrasse 83, D-74921, Helmstadt-Bargen; Gunter Schulze, Lutherstrasse 3, D-75228, Ispringen, all of Germany

[21] Appl. No.: 09/091,122
[22] PCT Filed: Dec. 11, 1996
[86] PCT No.: PCT/EP96/05544
§ 371 Date: Jun. 11, 1998
§ 102(e) Date: Jun. 11, 1998
[87] PCT Pub. No.: WO97/21557
PCT Pub. Date: Jun. 19, 1997

[30] Foreign Application Priority Data

Dec. 12, 1995 [DE] Germany ............... 195 46 316
Jan. 25, 1996 [DE] Germany ............... 196 02 593

[51] Int. Cl.$^6$ .................................. B01C 23/02
[52] U.S. Cl. ............ 73/146.5; 73/146.3; 116/34 R; 340/447
[58] Field of Search ............... 73/146.5, 146.2, 73/146.3; 116/34 R; 340/447

[56] References Cited

U.S. PATENT DOCUMENTS

| | | |
|---|---|---|
| 5,054,315 | 10/1991 | Dosjoub . |
| 5,109,213 | 4/1992 | Williams . |
| 5,231,872 | 8/1993 | Bowler et al. . |
| 5,285,189 | 2/1994 | Nowicki et al. . |
| 5,656,993 | 8/1997 | Coulthard ............... 73/146.5 X |

FOREIGN PATENT DOCUMENTS

4303583A1  8/1994  Germany .

*Primary Examiner*—Joseph L. Felber
*Attorney, Agent, or Firm*—Dvorak & Orum

[57] ABSTRACT

A method for operating devices on wheels having pneumatic tires to signal the tire pressure, i.e. the air pressure in the pneumatic tire, in which a pressure sensor measures the tire pressure at regular intervals, and an analysis circuit compares the tire pressure readings with a reference pressure and, in the event of deviations of the tire pressure reading from the reference pressure which exceed a threshold value $\Delta p$, transmits by radio, to an indicating device arranged separately from the wheel, a signal reporting the deviation, such that the device meets its energy needs from an electrical battery. Radio operation is discontinued as long as the pressure measured by the pressure sensor is below a preselected second pressure threshold, in particular a preselected absolute pressure value.

20 Claims, No Drawings

METHOD OF OPERATING TIRE PRESSURE SIGNALLING DEVICES ON WHEELS FITTED WITH PNEUMATIC TIRES

The invention relates to a method for operating devices on wheels having pneumatic tires to signal the tire pressure. A method of this kind is known from DE 43 03 583 A1. This document discloses d device having a device, arranged in the valve of the pneumatic tire, for generating a wirelessly transmittable pressure decrease indication signal, having a battery as power source, having a preferably semiconducting piezoresistive pressure sensor, having an analog-digital converter for digitizing the pressure signal obtained from the pressure sensor, having a memory for storing the pressure signal, having a comparator which compares the pressure signal with a previously stored comparison pressure signal, having a transmitter, and having a timing switch which activates the device from time to time and otherwise keeps it switched off in order to save power. The analog-digital converter, the memory, the comparator, and the timing switch are preferably realized in a module with a microprocessor which compares the pressure signal supplied by the pressure sensor with the previously stored comparison pressure signal, generates a signal if the deviation of the pressure signal from the comparison pressure signal exceeds a threshold value, and then activates a transmitter which thereupon transmits by radio, to a receiver arranged in the vehicle (in particular in the region of the dashboard) and having an analysis circuit and indicating unit, an information element concerning the deviation that has been ascertained; said receiver processes the information element and indicates to the driver the pneumatic tire in which the air pressure deviates significantly from the comparison pressure. The reference pressure of the pneumatic tire is stored in stable fashion, as the comparison pressure, each time the air pressure is checked with the aid of an external gauge at a filling station, and is set to its reference pressure by means of a compressed air source. For this purpose, the movement of the valve plunger is automatically monitored, for example by means of a magnet attached to the valve plunger which in turn actuates a magnetic switch when the valve plunger moves. When the device detects a movement of the valve plunger, the tire pressure measured thereafter is stored as the comparison pressure (reference pressure). Prior to initial use in a pneumatic tire, a reference pressure can be defined for and entered into the monitoring device by the manufacturer.

The practical applicability of a device of this kind for tire pressure monitoring depends on the fact that the device uses so little power that it is can operate for several years without a battery change. The transmitter has the highest power consumption. In the case of the known device, it is activated only if the deviation of the measured tire pressure from the reference value exceeds a predefined threshold value. Otherwise the pressure is measured not continuously but rather only at regular intervals, for example every 3 or 4 seconds, and compared with the reference value which is an absolute value.

Automobile manufacturers require, for such electronic monitoring devices which are preferably provided on the valve of vehicle wheels, a service life of at least 5 years without battery replacement. A service life on this order can now be approximately attained with modem batteries and the use of integrated circuits having a power consumption of less than 1 microampere. Difficulties result, however, if the electronic tire pressure monitoring devices sit in storage for some time before they are used on a vehicle. The storage time can range from a few weeks to two years, in particular in the accessories and spare-parts market. Since the electronic tire pressure monitoring device nevertheless becomes active as soon as the battery is inserted by the manufacturer, the maximum possible operating time on the vehicle, as determined by the battery service life, is shortened by a time equivalent to the storage time.

It is the object of the present invention to counteract this shortening of the operating time of the tire pressure monitoring device on the vehicle without impairing its operating reliability.

This object is achieved by means of the present invention. Advantageous developments of the invention are the subject of the dependent claims.

According to the invention, the tire pressure monitoring device is operated with two different pressure threshold values: As in the existing art, a first threshold value $\Delta p$ is defined for the deviation of the pressure measured by the pressure sensor from the reference pressure; if the threshold value $\Delta p$ is exceeded, the transmitter of the tire pressure monitoring device is activated, and the measured pressure value or its deviation from the reference value is transmitted by radio to the central analysis and/or indicating device provided in the vehicle. Deviations which do not exceed the first threshold value $\Delta p$ are categorized as being negligible, and are not signaled. According to the invention, a second pressure threshold, in particular an absolute pressure threshold, is also provided; if the measured pressure is so low that it falls below said second pressure threshold, this is categorized as a "wheel not in use" state, and radio operation is discontinued until the pressure measured by the pressure sensor exceeds the second pressure threshold in the opposite direction. If an absolute pressure is selected as the second pressure threshold, it must be set so low that the changes in pressure which occur during normal operation of the tire pressure monitoring device—in particular while the vehicle is in motion but also when it is stationery, and both "creeping" pressure losses which gradually impair vehicle safety and rapid pressure losses—are signaled in all cases before radio operation is discontinued. The preselected absolute pressure below which radio operation mode is discontinued must therefore maintain a much greater distance than $\Delta p$ from the reference pressure which is intended to be present in the pneumatic tires during normal vehicle operation.

The preselected absolute pressure can, for example, be set to a value which is somewhat higher than the atmospheric pressures which usually occur. In this case the tire pressure monitoring device does not resume radio operation as long as it is not installed in a wheel and the latter's pneumatic tire is not pumped up. Preferably, however, the preselected absolute pressure below which radio operation is discontinued is set much higher, preferably to a value of 1 to 1.2 bar above atmospheric pressure. Selecting the second pressure threshold in this fashion on the one hand yields a pressure threshold which is appropriate for practically all pneumatic tires on automobiles and lies sufficiently below the reference pressure for normal vehicle operation; on the other hand, there is the advantage that during the periods of non-use which occur in the summer for winter tires and in the winter for summer tires, radio operation can be deliberately discontinued by decreasing the air pressure in the tire to less than the preselected absolute pressure. Sufficient air pressure remains in the tire to allow the wheels to be stored properly during the period of non-use (over the winter for summer tires, and over the summer for winter tires). When the tires are then changed again with the change in season, the tire pressure in the wheels to be mounted on the vehicle must then in any case be reset, so that the tire pressure once again exceeds the preselected absolute pressure and radio operation can again be resumed in order to signal pressure deviations which exceed the threshold value Δp.

Power can thus also be economized even interim storage periods; and when summer tires and winter tires are used alternately, the battery service life can be extended beyond the required 5 years, and in some circumstances can be doubled.

The invention is advantageous in particular with a manner of operation in which the tire pressure monitoring device transmits a signal by radio not only if the deviation of the tire pressure from the reference pressure exceeds the predefined threshold value Δp, but moreover also transmits a signal by radio, at regular intervals (for example, 1-minute intervals), to the central analysis and indicating device in order to inform the latter that it is still ready to operate: this mode of operation ensures that malfunctions of the tire pressure monitoring device can also be detected, in particular a total failure. The radio signals which indicate operational readiness make a substantial contribution to energy consumption, however, and it is therefore particularly advantageous if, according to the invention, radio transmission of the operational readiness signals can be discontinued during periods of storage.

The alternative possibility, of switching tire pressure monitoring devices on or off as necessary by means of a separate switch in the current path between battery and electronics, has the disadvantage that a fault source is thereby introduced which diminishes operational reliability, especially under the severe service conditions on the vehicle wheel (temperature changes, load cycles, vibration, high centrifugal accelerations). The method according to the invention, on the other hand, has the advantage that it requires absolutely no refashioning of the tire pressure monitoring device.

In an advantageous operating mode, an absolute reference value for the air pressure is not stored in the tire pressure monitoring device as the comparison pressure signal; accordingly, the deviation of the existing tire pressure from the reference value is also not ascertained and signaled, but rather a drift of the tire pressure is sensed and signaled, and the comparison pressure signal is continuously adapted for that purpose. In the simplest case, the existing measured pressure is stored as the comparison pressure, and at the next pressure measurement the pressure which then exists is compared with the previously stored comparison pressure. In order to compensate for random measurement errors and avoid unnecessary activation of the transmitter, however, it is advantageous to constitute the comparison pressure signal not from the last pressure signal previously supplied by the pressure sensor, but from multiple pressure signals previously supplied by the sensor, e.g. by averaging based on the last three respective measured and stored pressure signals.

In order to make possible an operating principle of this kind, the monitoring device preferably contains a microprocessor or an application specific integrated circuit (ASIC).

This particular operating principle has advantages:
Changes in the tire pressure which occur so slowly that they are harmless do not cause an activation of the transmitter in each case. This applies in particular to pressure changes which are caused by temperature changes. These changes proceed so slowly that despite a low threshold value for the pressure deviation (at present, a pressure threshold between 10 and 100 mbar is possible with tolerable effort) and a periodic pressure measurement at time intervals which are optimally between 1 second and 10 seconds, temperature-related pressure changes do not cause activation of the transmitter even without the need for temperature compensation of the pressure measurement. This simplifies the configuration of the monitoring device in the valve, and spares the battery;

A drift resulting from unavoidable outward diffusion of air from the tire, which is by far the most frequent reason why air must be added to a tire, also proceeds so slowly that it does not lead to activation of the transmitter. The situation is different in the existing art: there, if the tire pressure has decreased, as a result of gradual and continuous diffusion, to the point that the pressure loss exceeds the threshold value, the transmitter is activated at each subsequent measurement which takes place, for example, every four seconds, because the value has fallen below the threshold: this continues until the driver has visited a filling station and corrected the tire pressure. Until then, however, a great deal of power is consumed from the battery for transmission. According to the invention, however, a slow drift in the tire pressure caused by diffusion does not cause activation of the transmitter. A hazardous situation is nevertheless not created thereby, since such slow pressure losses can be identified and corrected by means of checks occurring at longer intervals, for example at each refueling stop. Advantageously, however, the check is not entrusted to the driver on the occasion of a refueling stop; instead a report of the existing tire pressure is made—at time intervals which are long in terms of the time intervals at which the tire pressure is regularly checked (1 second to 10 seconds), and regardless of whether or not the threshold value has been exceeded—to the receiver provided at a central point in the vehicle, in which the signaled pressure values are processed and evaluated. A slow drift in the tire pressure is thereby sensed at reasonable, longer time intervals which spare the battery in the valve, and is indicated to the driver by means of, for example, an advisory saying in effect, "Please increase the right front tire pressure at the next refueling stop." Suitable time intervals at which an information element regarding the tire pressure is sent in all cases, regardless of whether a predefined threshold value has been exceeded, are between one minute and one hour, the longer time intervals being particularly preferred.

The design of the valve is simplified by the fact that a sensor is not required in order to monitor movement of the valve plunger.

Because a comparison with an absolute reference value of the air pressure is not performed in the monitoring device in the valve, it is also not necessary for a complete analysis to take place at each point: rather only a drift check must take place. Everything else can be entrusted to a central analysis computer. This has the further advantage that the tire pressure check is more reliable and is independent of operating errors when adding air to the tire and of calibration errors in the air pump gauge. If the comparison with an absolutely predefined reference pressure occurs only in a central computer, the latter can also indicate errors in the addition of air and authorize an immediate correction; in addition, centralized parameters can be taken into account, e.g. the loading status (cargo weight, particularly in the case of commercial vehicles; number of persons aboard, in the case of buses and passenger cars).

Sudden pressure losses resulting from damage to the tire or to its valve are particularly hazardous to vehicle safety. Pressure losses of this kind can be determined with particular reliability because the measurement intervals (the "first"

time intervals) can be short and the threshold value can be row, without shortening the battery service life that is possible in the existing art. In an advantageous development of the invention, provision is made for the "first" time intervals to be shortened as soon as a pressure loss exceeding the threshold value Δp is ascertained. A single pressure loss reading exceeding the threshold value might be the result of a random measurement error. In order to eliminate random warning signals, it is advantageous, following a pressure loss reading which exceeds the threshold value, to clarify the situation by causing additional measurements to follow at an increased measurement rate. If the subsequent measurements confirm the pressure drop, a warning signal can be sent very quickly. If the subsequent measurements do not confirm the pressure drop, however, it is apparent that an incorrect measurement was present, and the transmitter will not even be activated. In this fashion, with no loss of safety, the battery is spared and the driver is not irritated by incorrect measurements. In a preferred development of the invention, it is impossible for radio operation to be discontinued while pressure measurements are being made at the increased measurement rate, so that hazardous pressure losses, both gradual and rapid, can be detected and signaled in all cases.

Just as a pressure loss exceeding the threshold value can be ascertained, so can a pressure rise exceeding the threshold value Δp. This usually involves the operation of adding air. In this case the transmission of a signal reproducing the tire pressure can be postponed until the tire pressure has stabilized, i.e. the addition of air is complete.

Once the pressure loss and the pressure rise drop back below threshold value Δp, the time intervals at which the tire pressure is checked by means of the monitoring device arranged in the valve are once again lengthened.

In practical terms, the following procedure can be used to carry out the invention: As long as the pressure measured by the pressure sensor is lower than the second pressure threshold (preselected absolute pressure), a pressure measurement is performed, for example, every 60 seconds, and a check is made as to whether the measured pressure is still below said second pressure threshold, which preferably is approximately 1 bar above atmospheric pressure. A data transfer via radio is so far not occurring. If, however, a pressure is measured which is greater than the second pressure threshold, the radio inhibition is lifted and the tire pressure monitoring device is in its normal operating state, in which a comparison between setpoint and actual value is performed, and impermissibly high deviations are signaled by radio. If the measured pressure falls below the second pressure threshold at any time, radio operation is once again inhibited, except if the tire pressure monitoring device is in the condition of an increased measurement rate, which as a result of a rapid pressure drop is maintained for a fixed period of, for example, 180 seconds. During this fixed period in which the system is operating with an increased measurement and radio transmission rate, the hazardous pressure drop can be signaled; and only after said fixed period of, for example, 180 seconds has elapsed is further radio traffic inhibited if the pressure falls below the second pressure threshold (the predefined absolute pressure) and the hazardous pressure drop has been signaled.

We claim:

1. A method for operating devices on wheels having pneumatic tires to signal the tire pressure, i.e. the air pressure in the pneumatic tire, in which a pressure sensor measures the tire pressure at regular intervals, and an analysis circuit compares the tire pressure readings with a reference pressure and, in the event of deviations of the tire pressure reading from the reference pressure which exceed a threshold value Δp, transmits by radio, to an indicating device arranged separately from the wheel, a signal reporting the deviation, such that the device derives its energy needs from an electrical battery;

wherein radio operation is discontinued as long as the pressure measured by the pressure sensor is below a preselected second pressure threshold.

2. The method as defined in claim 1, wherein the second pressure threshold is constituted by an absolute pressure.

3. The method as defined in claim 2, wherein radio operation is discontinued if the tire pressure is less than 1.2 bar above ambient atmospheric pressure.

4. The method as defined in claim 2, wherein radio operation is discontinued if the tire pressure is less than 1.0 bar above ambient atmospheric pressure.

5. The method as defined in claim 2, for operating a tire pressure monitoring device whose analysis circuit has an analog-digital converter for digitizing the pressure signal obtained from the pressure sensor, a memory for storing the pressure signal, a comparator, a means radio transmitter, and timing switch which activates the device at the time intervals for a measurement and comparison operation and keeps it switched off at other times in order to save power, wherein the comparator means stores the transmitted pressure signal and, when the deviation of the pressure signal for the comparator pressure signal has been formed, forms with said pressure signal a new comparison pressure signal which replaces the previously stored comparison pressure signal.

6. The method as defined in claim 1, wherein radio operation is discontinued if the tire pressure is less than 1.2 bar above ambient atmospheric pressure.

7. The method as defined in claim 1, wherein radio operation is discontinued if the tire pressure is less than 1.0 bar above ambient atmospheric pressure.

8. The method as defined in claim 1, for operating a tire pressure monitoring device whose analysis circuit has an analog-digital converter for digitizing the pressure signal obtained from the pressure sensor, a memory for storing the pressure signal, a comparators means a radio transmitter, and a timing switch which activates the device at the time intervals for a measurement and comparison operation and keeps it switched off at other times in order to save power, wherein the comparator means stores the pressure signal and, when the deviation of the pressure signal from a comparison pressure signal has been formed, forms with said pressure signal a new comparison pressure signal which replaces the previously stored comparison pressure signal.

9. The method as defined in claim 8, wherein the new comparison pressure signal is formed from multiple pressure signals previously supplied by the pressure sensor.

10. The method as defined in claim 9, wherein the new comparison pressure signal is formed by averaging from the multiple pressure signals supplied by the pressure sensor and previously stored.

11. The method as defined in claim 8, wherein the timing switch activates the device at "first" time intervals of between 1 second and 10 seconds.

12. The method as defined in claim 11, wherein the timing switch activates the transmitter at "second" time intervals which are long compared with the "first" time intervals, and causes a status signal to be emitted even if a deviation exceeding the threshold value Δp has not been ascertained.

13. The method as defined in claim 12, wherein the "second" time intervals are between 1 minute and 1 hour.

14. The method as defined in claim 11, wherein the threshold value Δp and the "first" time intervals at which the device is activated are adjusted to one another so that the quotient of the threshold value Δp and the "first" time interval is large compared with rates of change in tire pressure which typically occur, in the absence of leaks in the tire or the valve, due to changes in tire temperature as a result of vehicle operation.

15. The method as defined in claim 11, wherein a gradual pressure loss which lies below threshold value Δp is determined by analysis of the status signals (tire pressure information elements) sent at the "second" time intervals.

16. The method as defined in claim 11, wherein if a deviation exceeding the threshold value Δp is ascertained, the "first" time intervals during which the pressure measurement and comparison operations take place in the device are shortened, and the transmitter is activated if the fact that the threshold value Δp has been exceeded is confirmed for a number of pressure measurement and comparison operations which follow during the shortened "first" time intervals.

17. The method as defined in claim 16, wherein if the pressure loss or pressure rise drops back below the threshold value Δp, the shortened "first" time intervals are lengthened again to the original "first" time intervals and only then is a new comparison pressure signal formed.

18. The method as defined in claim 8, wherein the absolute tire pressure values are processed and evaluated in the receiving and indicating device, whereas in the device arranged on the wheel, the measured tire pressure values are evaluated only with regard to a drift in the tire pressure.

19. The method as defined in claim 1, wherein the absolute tire pressure values are processed and evaluated in the receiving and indicating device, whereas in the device arranged on the wheel, the measured tire pressure values are evaluated only with regard to a drift in the tire pressure.

20. The method as defined in claim 1, for operating a tire pressure monitoring device whose analysis circuit has an analog-digital converter for digitizing the pressure signal obtained from the pressure sensor, a memory for storing the pressure signal, a comparator, means a radio transmitter, and timing switch which activates the device at the time intervals for a measurement and comparison operation and keeps it switched off at other times in order to save power, wherein the comparator means stores the transmitted pressure signal and, when the deviation of the pressure signal for the comparator pressure signal has been formed, forms with said pressure signal a new comparison pressure signal which replaces the previously stored comparison pressure signal.

* * * * *